United States Patent
Tseytin

(10) Patent No.: US 7,685,584 B1
(45) Date of Patent: Mar. 23, 2010

(54) HEURISTIC METHOD FOR THE ANALYSIS OF SWITCH TABLES IN POSITION-INDEPENDENT BINARY CODE

(75) Inventor: Gregory S. Tseytin, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/348,710

(22) Filed: Jan. 5, 2009

(51) Int. Cl.
*G06F 9/45* (2006.01)

(52) U.S. Cl. .................. 717/153; 717/151

(58) Field of Classification Search ......... 717/124–135, 717/140–161
See application file for complete search history.

(56) References Cited

U.S. PATENT DOCUMENTS

| | | | |
|---|---|---|---|
| 5,339,420 A * | 8/1994 | Hoxey | 717/151 |
| 6,006,033 A * | 12/1999 | Heisch | 717/158 |
| 6,014,513 A * | 1/2000 | Voelker et al. | 717/131 |
| 6,308,321 B1 * | 10/2001 | Schooler | 717/132 |
| 6,412,105 B1 * | 6/2002 | Maslennikov et al. | 717/151 |
| 6,564,197 B2 | 5/2003 | Sahami et al. | |
| 6,941,492 B1 * | 9/2005 | Ezra et al. | 714/38 |
| 7,272,612 B2 | 9/2007 | Birdwell et al. | |
| 2005/0187897 A1 * | 8/2005 | Pawar et al. | 707/1 |

OTHER PUBLICATIONS

Holsti, Niklas, "Analysing Switch-Case Tables by Partial Evaluation," 2007, Tidorum Ltd, p. 1-8.*

* cited by examiner

*Primary Examiner*—Wei Y. Zhen
*Assistant Examiner*—Qing Chen
(74) *Attorney, Agent, or Firm*—Cahn & Samuels, LLP

(57) ABSTRACT

A system and method for the analysis of putative switch tables in position-independent binary code. The method includes defining a block of data as a potential switch table by computing one or more switch targets. The switch targets are computed by, determining the reference address (point) of the switch table, determining the size of the entry in the switch table and determining the target address by adding the value of the entry to the reference address wherein said reference address and said target address define a selected block of data. The method also includes evaluating the selected block of data as a potential switch table and determining the best value and the best split for a selected block of data. The method also includes determining the best list of switch tables from a selected block of data.

1 Claim, 3 Drawing Sheets

HEURISTIC METHOD FOR THE ANALYSIS OF SWITCH TABLES IN POSITION-INDEPENDENT BINARY CODE

I. FIELD OF THE INVENTION

This invention relates to a method for the analysis of putative switch tables in position-independent binary code.

II. BACKGROUND OF THE INVENTION

Position-independent code is generated by compilers when the virtual address of the instruction is not known at compilation time. Switch tables, typically needed for implementation of switches in C and other similar computer languages, cannot contain actual addresses to which control needs to be passed for each value of the switch variable, but instead contain the addresses relative to some known point (referred to as the reference point or reference address) of the instruction.

A position-independent switch table or switch table, is a block of contiguous entries, each entry representing a number, which is expected to be added to a reference address to obtain the address of the instruction to which control needs to be transferred for a specific value of the variable used in the switch.

Traditional analysis of binary code, as used in the object code insertion technology, tries to detect switches by analyzing instructions and possible values in machine registers. Sometimes the analysis misses switches or finds a switch and its reference point but does not determine the switch table size correctly.

Switch tables usually look like contiguous blocks of data but a switch table can be adjacent to another block of data (e.g., another switch table). An incorrect analysis or misidentification regarding the beginning or end of a switch table, causes multiple switch tables to be identified and subsequently treated as a single switch table. This can result in the introduction of various errors in subsequent processing. Thus, it would be useful to improve the accuracy of the analysis of putative switch tables.

III. SUMMARY OF THE INVENTION

Disclosed is a system and method for the analysis of putative switch tables in position-independent binary code. This method is based on evaluation of a putative switch table (with the reference point and size known) by computing switch targets (i.e., points where the control will be transferred by the switch) and analyzing the instructions at those points as well as adjacent instructions.

The method employs an optimization procedure, evaluating all parts of the suspected block of data as potential switch tables and finds the most likely decomposition of the block of data into probable switch tables.

The disclosed method includes defining a block of data as a potential switch table by computing one or more switch targets. The switch targets are computed by, determining the reference address (point) of the switch table, determining the size of the entry in the switch table and determining the target address by adding the value of the entry to the reference address wherein said reference address and said target address define a selected block of data. The method also includes evaluating the selected block of data as a potential switch table and determining the best value for a selected block of data. The method also includes determining the best list of switch tables from a selected block of data.

Also disclosed is a computer program product comprising a computer-usable medium having a computer-usable program code for the analysis of putative switch tables in position-independent binary code. The computer program product also includes computer usable program code for defining a block of data as a potential switch table by computing one or more switch targets, as well as computer usable program code for determining the reference address of the switch table, computer useable program code for determining the size of the entry in the switch table, and computer usable program code for determining the target address by adding the value of the entry to the reference address wherein said reference address and said target address define a selected block of data. The computer program product also includes computer usable program code for evaluating the selected block of data as a potential switch table and determining the best value and the best split for a selected block of data. The computer program product also includes computer usable program code for determining the best list of switch tables from a selected block of data.

The disclosed system and methods provide a way to improve the accuracy of the data analysis by using assumptions about the switch code which don't need to always be accurate, but are often accurate.

This disclosed system and methods can be applied either independently of the general analysis, producing probable switch tables with their sizes, which need to be verified by other methods, or in the process of the analysis when a reference point is detected but an independent estimation of the size of the switch table is needed.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWING

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for purposes of illustration. A person skilled in the relevant art will recognize that other components and configurations may be used without departing from the spirit and scope of the invention.

The disclosed system and methods employ three basic assumptions relating to the structure of the code. First, switch cases are adjacent pieces of code, each starting with one of the switch targets (some cases can use the same target), and their order is the same as it was in the source code. Second, each case ends in either an unconditional branch or continues into the next switch case. If it ends in an unconditional branch, the branch will typically represent a break statement or a return statement, and will be followed by the next switch case, if any. Third, a break statement is implemented as an unconditional branch to a point following the whole block of switch cases.

Figure 1:
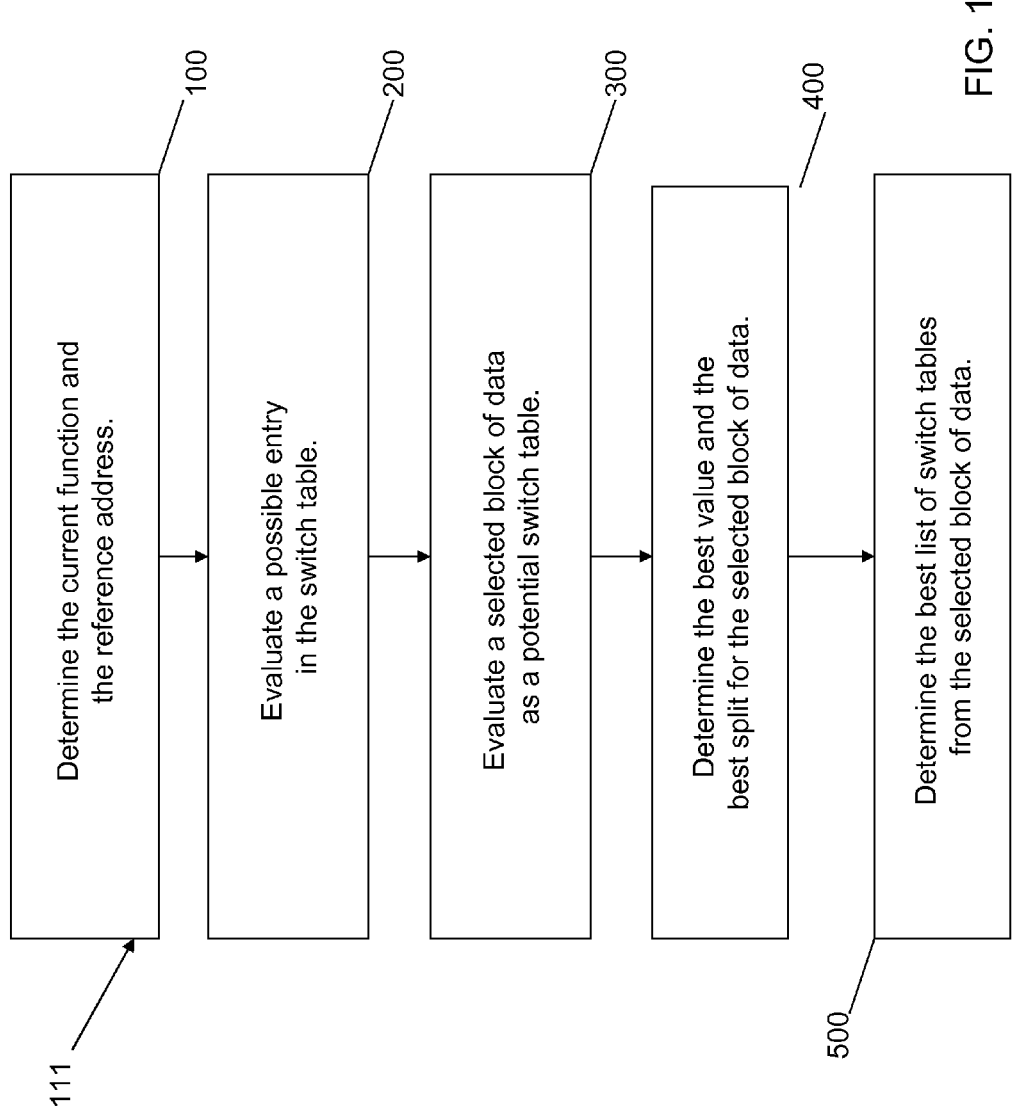
FIG. 1 illustrates a flowchart of an exemplarily method for the analysis of putative switch tables in position-independent binary code.

Referring to the figures, wherein like elements are denoted by like numbers, FIG. 1 illustrates a flow diagram for an exemplarily method for the analysis of putative switch tables in position-independent binary code. In the exemplarily flowchart 111 of FIG. 1, the system determines the current function and the reference addresses 100.

The current function is a function in the code that contains the switch statement for which the table has been built. If the function is not known, one may assume that one of the two functions located close to the switch table (before or after), or leave it undefined until the system can first make a useful assumption about the current function. Once the current function is defined, the initial value is set, and target addresses are computed based on the initial value for the switch table. The "value" is a number which is to represent the likeliness of a specific choice of a switch table of an entry within the table. The initial value is set to 0 or another predefined value, in order to change it as more data are collected.

Figure 2:
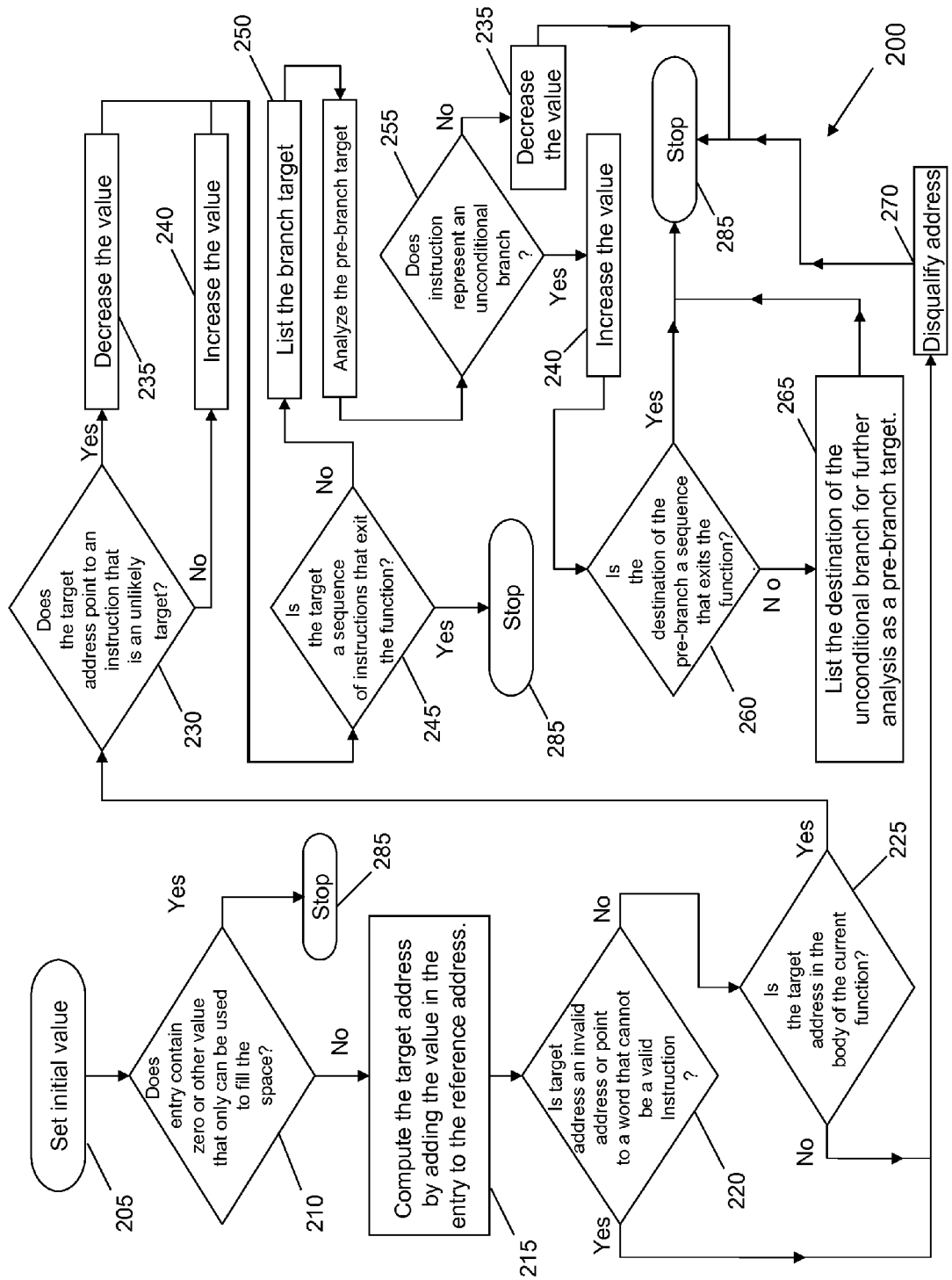
FIG. 2 illustrates a flowchart for an exemplarily algorithm for evaluating a possible entry in the switch table.

The method includes evaluating each computed value to determine if the target address, determined based on the computed value, are possible entries in the switch table 200. This process is performed by an entry evaluation algorithm. FIG. 2 illustrates a flowchart for an exemplarily algorithm for evaluating a possible entry in the switch table.

With continued reference to FIG. 1 the system selects block of data as a potential switch table by computing one or more switch targets. The switch targets are computed by, determining the reference address (point) of the switch table, determining the size of the entry in the switch table and determining the target address by adding the value of the entry to the reference address wherein said reference address and said target address define a selected block of data.

Figure 3:
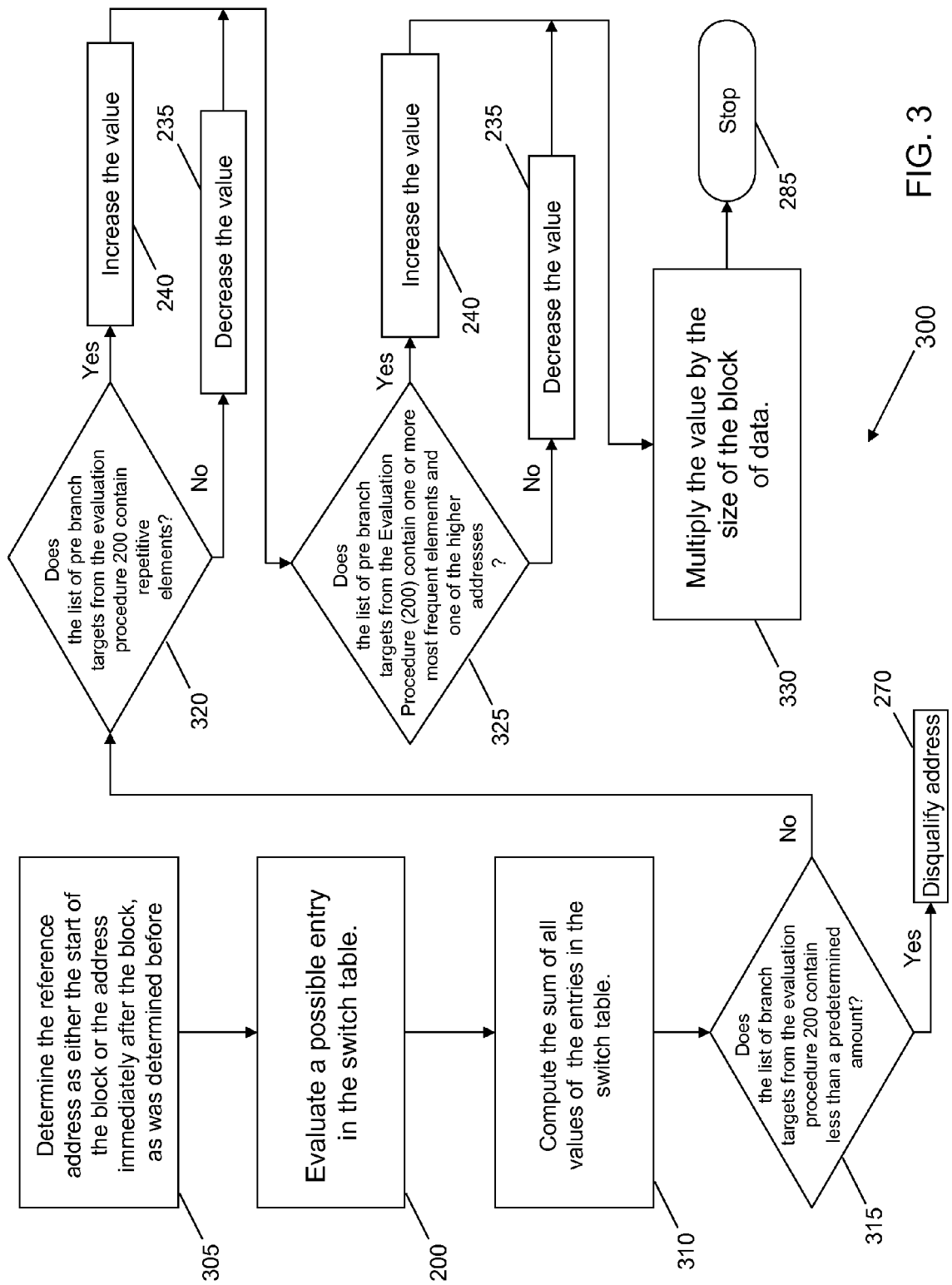
FIG. 3 illustrates a flowchart for an exemplarily algorithm for evaluating a selected block of data as a possible switch table.

The system next evaluates the selected block of data as a potential switch table 300. FIG. 3 illustrates flowchart for an exemplarily algorithm for evaluating a selected block of data as a possible switch table. With continued reference to FIG. 1, the system next determines the best value and the best split for a selected block of data 400. The best value is determined by employing the block evaluation algorithm of step 300 discussed in greater detail below.

The best split is determined by considering all possible splitting points for the selected block of data (if the block of data has m entries, there are m−1 splitting points; none if the block is just one entry). For each splitting point, the system adds the previously computed best values for the two parts, and selects the highest value of all those sums and the value of the whole block computed previously by the block evaluation algorithm. This is considered the best value of the whole block, and if it came from a splitting point, that will be the best split for the block, otherwise there will be no best split.

With continued reference to FIG. 1 the system then determines the best list of switch tables from a selected block of data 500. The system determines the best list from a selected block by taking the selected block and considering all parts of it representing contiguous subblocks. If the block has n elements then it will have $n*(n+1)/2$ subblocks. The system then chooses an ordering of them such that a subblock contained in a larger subblock precedes the larger one (e.g., order them by increasing length). In this order, the system executes the block split process for each subblock, starting the list of best switch tables by putting the whole block into the list.

If the list contains a block that has a best split, that block is removed and instead the two parts are added to the same lists. This step is repeated until there are no more blocks on the list with best splits. The resulting list will be the best list of switch tables.

While this method is most effective on switch tables for which the reference address is the address of either the first entry or the address immediately following the last entry. Typically, it is known from preceding analysis whether the tables are of one of those types, and also what is the size of a single entry in the switch table (typically, 4 or 8 bytes). The procedure, can however, be employed on tables with other types of reference addresses.

FIG. 2 which illustrates a flowchart for an exemplarily algorithm for evaluating a possible entry in the switch table. Referring now to FIG. 2 with continued reference to FIG. 1, the system first sets the initial value 205. The initial value is set to 0 or another predefined value, in order to change it as more data are collected.

The system then will test the initial value 210. If the entry contains zero or other value that only can be used to fill the space the process with stop 285. If the entry does not contain zero or a space filler value, the system computes the target address by adding the value in the entry to the reference address 215.

The system then evaluates the target address 220. If the target address is not a valid address or points to a word that cannot be a valid instruction, the system disqualifies that address 270 and stops 285. The address is disqualified by decreasing the value so much that it is unlikely to be higher in any other case.

The system again evaluates the target address 225. If the target address is not in the body of the current function, the system will disqualify that address 270 and stop 285.

If the target address points to an instruction that is an unlikely target in the given machine architecture 230, the system will decrease the value 235. The value is decreased by subtracting a specified non-negative number (depending on the type of the case discussed) to the value; possibly subtracting just zero; the number to be subtracted can be selected in the implementation or made dependent on the current value, but the simplest assumption is to have just a constant value, specific for each case. Otherwise the system will increase the value 240. The value is increased by adding a specified non-negative number (depending on the type of the case discussed) to the value; possibly adding just zero; the number to be added can be selected in the implementation or made dependent on the current value, but the simplest assumption is to have just a constant value, specific for each case.

The system again evaluates the target 245. If the target can be identified as a sequence of machine instructions that exit the function the algorithm will stop 285. If the target does not identify as a sequence of instructions that exit the function the system will list the branch target 250 for future processing.

The system then analyzes the machine instruction(s) immediately preceding the target to see if they represent an unconditional branch 255. If not, the system decreases the value and exits 235. If the instruction represents an unconditional branch 255, the system increases the value 240. If the destination of the unconditional is determined to be a sequence of instructions that exit the function 260 the process will stop 285. If not the destination will be added to the list as an unconditional branch for further analysis (it will be called a pre-branch target) 265.

FIG. 3 illustrates a flowchart for an exemplarily algorithm for evaluating a selected block of data as a possible switch table. The current function is known. Once a reference address is defined, a block of data is extrapolated therefrom. The selected block of data is then evaluated. Referring now to FIG. 3, with continued reference to FIG. 1 and FIG. 2, the system employs a block evaluation process or algorithm 300 determining the reference address as either the start of the block or the address immediately after the block, as was determined in prior processing 305.

For each entry in the block, the system evaluates the entry using the entry evaluation process or algorithm 200. The system computes the sum of all values of the entries 310, and evaluates the list of pre-branch targets to determine if the list of branch targets from the entry evaluation algorithm 200 contains less than a predetermined amount of elements 315. If the list of branch targets from entry evaluation algorithm contains too few elements (e.g., less than 3), then that switch table is disqualified 270.

If not disqualified, the system then evaluates the list of pre-branch targets to determine if the list contains repetitive elements 320. If the list of pre-branch targets from the entry evaluation algorithm contains repeated elements, the system increases the value 240, otherwise the system decreases the value 235.

The system then evaluates the list of pre-branch targets from the entry evaluation algorithm to determine if the list contains one or more most frequent elements, and if one of those most frequent elements represents a higher address than all branch targets from the entry evaluation algorithm 325. If the list of pre-branch targets from the entry evaluation algorithm contains one or more most frequent elements, and one of those most frequent elements represents a higher address than all branch targets from the entry evaluation algorithm 200, the system increases the value 240. Otherwise the system will decrease the value 235. Optionally, the value may be multiplied by the size of the block 330. This computed value is considered the computed best value of the whole block and is used to determine the best split 400 and ultimately the best list of switch tables 500.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In yet another embodiment the invention resides in a method for the analysis of putative switch tables in position-independent binary code. The method includes defining a block of data as a potential switch table by computing one or more switch targets. The switch targets are computed by, determining the reference address (point) of the switch table, determining the size of the entry in the switch table and determining the target address by adding the value of the entry to the reference address wherein said reference address and said target address define a selected block of data. The method also includes evaluating the selected block of data as a potential switch table and determining the best value and the best split for a selected block of data. The method also includes determining the best list of switch tables from a selected block of data.

In yet another embodiment the invention resides a computer program product comprising a computer-usable medium having a computer-usable program code for the analysis of putative switch tables in position-independent binary code. The computer program product also includes computer usable program code for defining a block of data as a potential switch table by computing one or more switch targets as well as computer usable program code for determining the reference address of the switch table, computer useable program code for determining the size of the entry in the switch table and computer usable program code for determining the target address by adding the value of the entry to the reference address wherein said reference address and said target address define a selected block of data. The computer program product includes computer usable program code for evaluating the selected block of data as a potential switch table and determining the best value and the best split for a selected block of data. The computer program product includes computer usable program code for determining the best list of switch tables from a selected block of data.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

What is claimed is:

1. A method for the analysis of putative switch tables in position-independent binary code in a computer system comprising:
    determining a current function and an initial value for a switch table wherein target addresses are computed based on the initial value for the switch table;
    evaluating each of the target addresses to determine if the target addresses are possible entries in the switch table;
    defining a block of data as a potential switch table by computing one or more switch targets;
    computing said one or more switch targets by,
        determining a reference address of the potential switch table;
        determining the size of an entry in the potential switch table; and
        determining a target address by adding the value of the entry to the reference address, wherein said reference address and said target address define a selected block of data;
    evaluating the selected block of data as the potential switch table by analyzing instructions at said one or more switch targets as well as adjacent instructions;
    determining a best value and a best split for the selected block of data; and
    determining a best list of switch tables from the selected block of data.

* * * * *